United States Patent
Noh et al.

(10) Patent No.: US 9,640,811 B2
(45) Date of Patent: May 2, 2017

(54) FUEL CELL SYSTEM HAVING EJECTOR

(71) Applicant: Hyundai Motor Company, Seoul (KR)

(72) Inventors: Yong Gyu Noh, Gyeonggi-do (KR); Sekwon Jung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 453 days.

(21) Appl. No.: 14/486,150

(22) Filed: Sep. 15, 2014

(65) Prior Publication Data

US 2015/0079489 A1 Mar. 19, 2015

(30) Foreign Application Priority Data

Sep. 16, 2013 (KR) .................. 10-2013-0111104

(51) Int. Cl.
*H01M 8/04082* (2016.01)
*H01M 8/04007* (2016.01)
*H01M 8/04119* (2016.01)

(52) U.S. Cl.
CPC ... *H01M 8/04201* (2013.01); *H01M 8/04074* (2013.01); *H01M 8/04126* (2013.01); *H01M 8/04141* (2013.01); *H01M 8/04164* (2013.01); *H01M 2250/20* (2013.01); *Y02T 90/32* (2013.01)

(58) Field of Classification Search
CPC ......... H01M 8/04201; H01M 8/04074; H01M 8/04126; H01M 8/04141; H01M 8/04164; H01M 2250/20

See application file for complete search history.

(56) References Cited

U.S. PATENT DOCUMENTS

| | | |
|---|---|---|
| 5,361,322 A | 11/1994 | Glucksman |
| 6,653,012 B2 | 11/2003 | Suzuki et al. |
| 6,682,002 B2 | 1/2004 | Kyotani |

FOREIGN PATENT DOCUMENTS

| | | |
|---|---|---|
| JP | 02-237662 A | 9/1990 |
| JP | 2005233152 A | 9/2005 |
| KR | 10-0671681 B1 | 1/2007 |
| KR | 10-2007-0100099 A | 10/2007 |
| KR | 10-2011-0033739 A | 3/2011 |
| KR | 10-2012-0038756 | 4/2012 |
| KR | 10-20147-0087859 | 7/2014 |

*Primary Examiner* — Jane Rhee

(74) *Attorney, Agent, or Firm* — Mintz Levin Cohn Ferris Glovsky and Popeo, P.C.; Peter F. Corless

(57) ABSTRACT

A fuel cell system with an ejector is provided. In particular, the system includes a stack, fuel injection nozzle and a water injection nozzle. In particular, the stack produces electricity via an electrochemical reaction using fuel and air. The fuel injection nozzle injects fuel into the stack and the water injection nozzle injects water into the fuel injection nozzle. In particular, water is supplied from the water injection nozzle into the fuel injection nozzle due to a vacuum within the fuel injection nozzle.

16 Claims, 13 Drawing Sheets

FUEL CELL SYSTEM HAVING EJECTOR

CROSS-REFERENCE TO RELATED APPLICATION

This application claims priority to and the benefit of Korean Patent Application No. 10-2013-0111104 filed in the Korean Intellectual Property Office on Sep. 16, 2013, the entire contents of which are incorporated herein by reference.

BACKGROUND OF THE INVENTION (a) Field of the Invention

The present invention relates to a fuel cell system having an ejector that stably supplies fuel and moisture to a fuel cell stack that produces electric energy by using the fuel and air to stably produce electricity.

(b) Description of the Related Art

Fuel cell vehicles operating via a fuel cell system often supply hydrogen (as fuel) to a fuel cell stack to produce electricity via an electrochemical reaction. This electricity is then used to power an electric motor to drive the vehicle. As such, a fuel cell system is a kind of power generation system that electrochemically converts chemical energy of fuel directly into electric energy in the fuel cell stack without converting the chemical energy of the fuel into heat by combustion.

In the fuel cell system, high-purity hydrogen is typically supplied from a hydrogen storage tank to a fuel electrode (anode) of the fuel cell during operation and air from the atmosphere is supplied directly to an air electrode (cathode) of the fuel cell via an air supply device such as an air blower.

The hydrogen supplied to the fuel cell stack is generally separated into a hydrogen ion and an electron as a catalyst of the fuel electrode (anode) and the separated hydrogen ion moves toward the air electrode (cathode) through a polymer electrolyte membrane. Oxygen supplied to the air electrode is combined with the electron that enters the air electrode through an external conducting wire to generate electric energy while generating water.

In order to properly operate a fuel cell, moisture needs to be appropriately maintained in a membrane electrode assembly (MEA) of the fuel cell stack, and a humidifier should be installed on each fuel circulation line and air circulation line that circulates the stack to operate the stack effectively.

However, this humidifying device/system is conventionally disposed outside the stack and thus requires additional space within the vehicle and often involves a complicated pipe connection.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a fuel cell system which utilizes an ejector that can reduce the capacity of an external humidifier or omit a humidifier from the system by continuously reusing moisture generated in an air electrode or a fuel electrode.

An exemplary embodiment of the present invention provides a fuel cell system with an ejector. In particular, a stack is provided which produces electricity via an electro-chemical reaction between fuel and air and a fuel injection nozzle is disposed within the system to inject fuel into the stack. A water injection nozzle is also disposed within the system to inject water into the fuel injection nozzle. This water may be supplied to the water injection nozzle via pressure from the fuel injected via the fuel injection nozzle.

More specifically, a fuel injection aperture disposed to receive and inject the fuel may be formed in the fuel injection nozzle. Likewise, a water injection aperture of the water injection nozzle may be disposed at a center of the fuel injection aperture.

Furthermore, a water supply line may be connected with the water injection nozzle in order to supply water contained in a lower portion of a condensed water reservoir to the water injection nozzle. The fuel injection nozzle may be disposed in an intake chamber of the ejector where gas circulated in the stack and the fuel are mixed with each other. A notch may be formed at the fuel injection aperture of the fuel injection nozzle.

The fuel injection nozzle may be disposed in the condensed water reservoir in which condensed water is contained, and a main fuel injection nozzle that injects fuel separately from the fuel injection nozzle may be disposed in the intake chamber of the ejector.

The fuel injection nozzle may be disposed in a manifold adjacent to the stack, and a main fuel injection nozzle that injects fuel separately from the fuel injection nozzle may be disposed in the intake chamber of the ejector.

The system may further include a water supply line which is connected with the water injection nozzle to supply water to the water injection nozzle The water supply line may be connected with each of a first condensed water reservoir gathers moisture from the fuel circulated in the stack and a second condensed water reservoir which gathers moisture inform the air circulated in the stack.

A level sensor may be disposed to sense a level of the water contained in the second condensed water reservoir a and a water supply control valve may be disposed on a water supply line that connects the second reservoir and the water injection nozzle. Furthermore, a control unit may open the water supply control valve when judged determination by the control unit is made that the level of the water contained in the second reservoir is equal to or higher than a set value.

The system may further include a fuel control valve which controls the fuel supplied to the fuel injection nozzle; and a main fuel control valve which controls the fuel supplied to the main fuel injection nozzle.

Advantageously, according to an exemplary embodiment of the present invention, it is possible to reduce a size of an external humidifier or even completely remove a humidifier from the fuel cell system by reusing water generated in an air electrode or a fuel electrode. As such, the required external humidification can be greatly reduced by minimizing or removing water that moves from the air electrode to the fuel electrode and at the same time managing moisture within the fuel electrode.

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
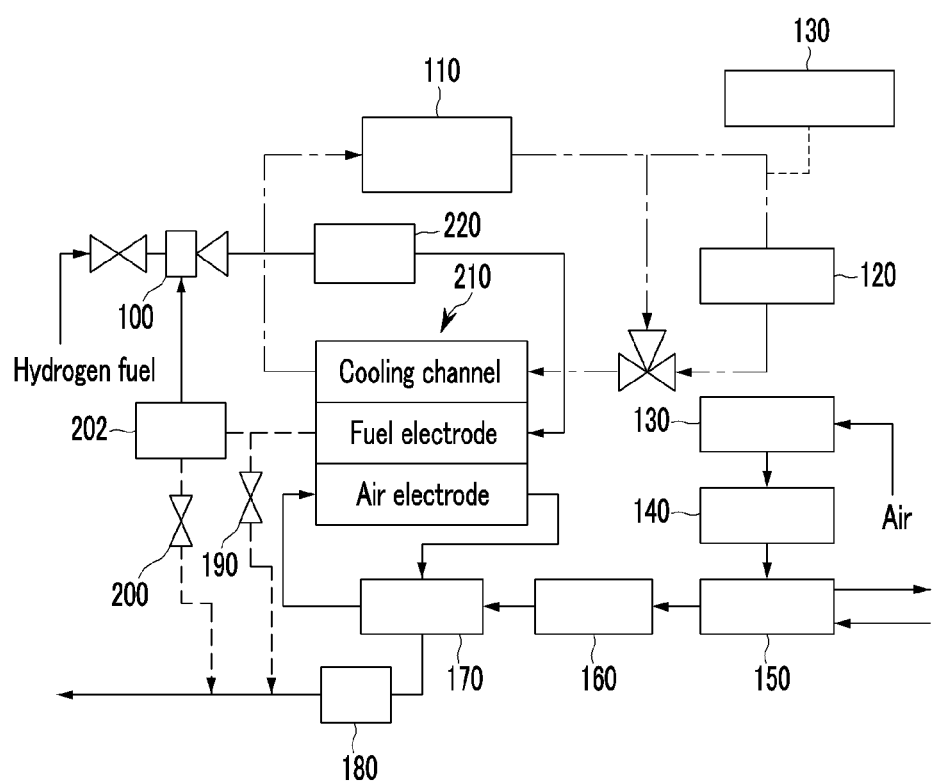
FIG. 1 is an overall configuration diagram of a fuel cell system.

FIG. 1 is an overall configuration diagram of a fuel cell system. Referring to FIG. 1, the fuel cell system may include a stack 210 including a cooling channel, a fuel electrode, and an air electrode. The fuel cell system may include a filter 130, a silencer 140, a compressor 150, an intercooler 160, a humidifier 170, and a discharge valve 180 as components that circulates air to the air electrode of the stack 210.

The fuel cell system may also include a coolant reservoir 105, a radiator 120, and a water pump 110 as components that circulate coolant to the cooling channel, and an ejector 100, a humidifier 220, a reservoir 202, a purge valve 190, and a drain valve 200 as components that supply hydrogen which is fuel to the fuel electrode.

In the exemplary embodiment of the present invention, the related art is referred to for a detailed description of structures and functions of respective components of the fuel cell system and a detailed description thereof will be omitted. Water is generated from the air electrode in a proton exchange membrane fuel cell (PEMFC) of the stack 210 and conductivity of an electrode membrane is improved by moisture being supplied from the outside. That is, forming appropriate moisture to an MEA is essential for proper operation.

As illustrated, a humidifier is included in a line that is circulated to the air electrode and the humidifier is installed at a hydrogen supply side to achieve proper operation. However, a separate installation space is required to install a separate humidifier and piping may be complicated. Moreover, the moisture ($H_2O$) generated from the air electrode in the stack 210 is present in a liquid or vapor form depending on temperature and is transferred to the fuel electrode through a membrane of the air electrode due to a pressure difference.

The amounts of water and vapor of the fuel electrode are changed depending on driving conditions and the water and vapor are discharged to the outside by a condensed water reservoir or drain valve through an appropriate method by reducing a hydrogen reaction. That is, an unbalanced driving pattern is provided in which the moisture is replenished from the outside in the air electrode and the moisture is discharged to the outside in the fuel electrode.

Figure 2:
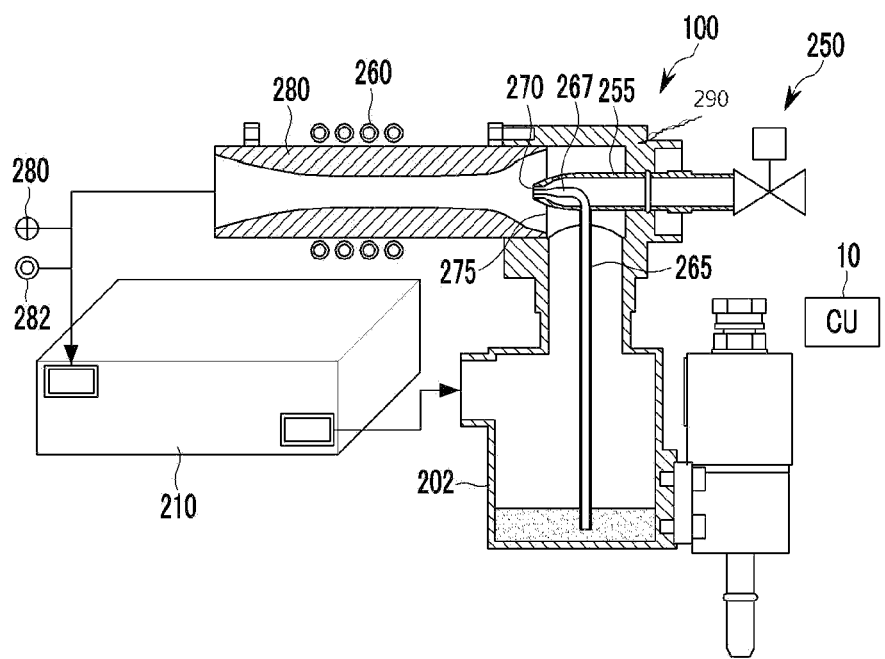
FIG. 2 is an overall configuration diagram of a fuel cell system having an ejector according to an exemplary embodiment of the present invention.
Figure 3:
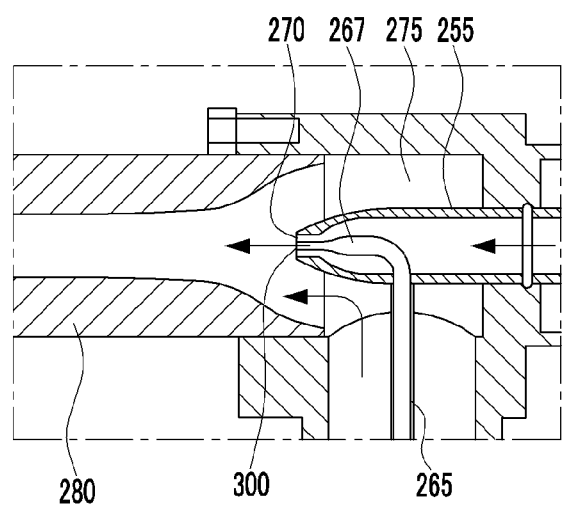
FIG. 3 is a partial detailed cross-sectional view of a fuel cell system having an ejector according to a first exemplary embodiment of the present invention.

FIG. 2 is an overall configuration diagram of a fuel cell system having an ejector according to an exemplary embodiment of the present invention. FIG. 3 is a partial detailed cross-sectional view of a fuel cell system having an ejector according to a first exemplary embodiment of the present invention.

Referring to FIGS. 2 and 3, a part of the fuel cell system may include the stack 210, the condensed water reservoir 202, the ejector 100, a fuel injection nozzle 255, a mixture pipe 280, a water injection nozzle 267, a water supply line 265, a heater 260, a pressure sensor 280, and a humidity sensor 282. An intake chamber 275 is disposed inside the ejector 100 and the fuel injection nozzle 255 is disposed in the intake chamber 275.

A fuel injection aperture 270 is formed at the end of the fuel injection nozzle 255 The water injection nozzle 267 may be disposed inside the fuel injection nozzle 255, and a water injection aperture 300 of the water injection nozzle 267 may be disposed at a center of the fuel injection aperture 270 of the fuel injection nozzle 255.

A fuel control valve 250 may be disposed in the system in order to control the flow of hydrogen which is the fuel supplied to the fuel injection nozzle 255 and a control unit 10 may be configured to control the fuel control valve 250 according to a driving condition including a load/pressure/humidity of the stack 210.

Furthermore, a water supply line 265 may be provided in order to supply water to the water injection nozzle 267. This water supply line 265 may extend downward into the condensed water reservoir 202.

When the fuel control valve 250 is opened by the control unit 10, the hydrogen may be injected from the fuel injection aperture 270 of the fuel injection nozzle 255. At this point, a vacuum is formed by the injected hydrogen. As a result, water is pulled through the water supply line 265, and is injected from the water injection aperture 300 of the water injection nozzle 267 in to the fuel injection nozzle 255.

In the exemplary embodiment of the present invention, the amount of moisture discharged from the stack 210 of the fuel cell varies due to various factors including driving temperature, pressure, and the like. As such, the hydrogen injected by the fuel injection nozzle 255 has a sonic velocity (Mach=1, approximately 1200 m/s) and the water is pulled into the fuel injection nozzle via vacuum pressure which is caused by the velocity.

The water injected by the water injection nozzle 267 is atomized by the flow of the hydrogen to be mixed with the fuel. Moreover, supply/mixture performance of the fuel and the water may be improved by intermittently opening the fuel control valve 250.

In the exemplary embodiment of the present invention, when a driving load is increased, an operating temperature of the stack is increased, an inlet of the fuel electrode becomes dry, and the amount of discharge water is increased. As described above, the discharged water is recirculated to the fuel electrode again to reduce a size of an external humidifier or omit the external humidifier altogether.

Figure 4:
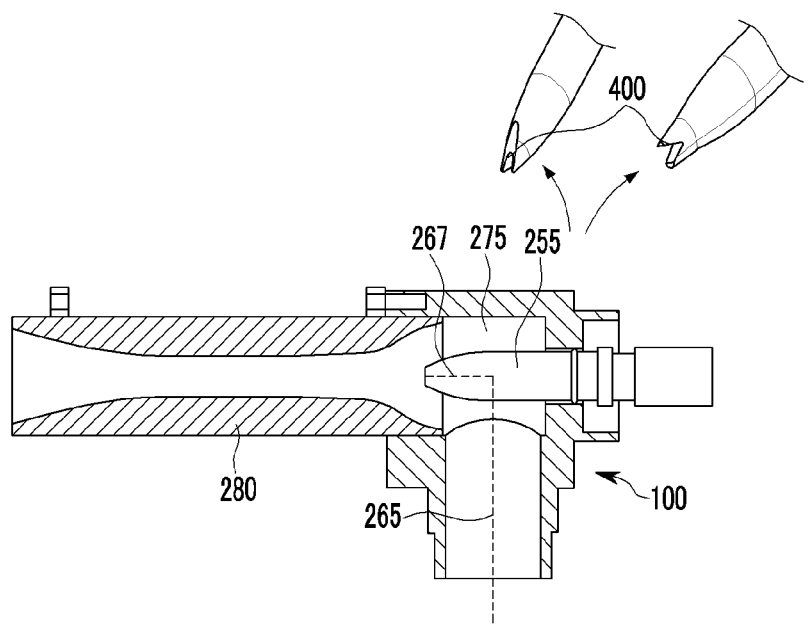
FIG. 4 is a partial detailed cross-sectional view of a fuel cell system having an ejector according to a second exemplary embodiment of the present invention.

FIG. 4 is a partial detailed cross-sectional view of a fuel cell system having an ejector according to a second exemplary embodiment of the present invention. A description of similar parts will be skipped in FIG. 4 as compared with FIGS. 1 to 3 and only a distinct difference will be described.

Referring to FIG. 4, a notch 400 is formed at the fuel injection aperture 270 of the fuel injection nozzle 255. The notch 400 is formed inside the fuel injection aperture 300 (FIG. 3) in an A or V shape and turbulence intensity of the hydrogen injected from the fuel injection nozzle 255 is increased to minimize and unify a particle size and strengthen a mixture of the hydrogen and the recirculated gas.

In the exemplary embodiment of the present invention, water injection may be suppressed under a low-load condition and the water injection may be performed under a set load or more. Moreover, an inner diameter of the water supply line 265 may be controlled, an aperture (not illustrated) may be formed on the water supply line, or the height of the water supply line 265 may be controlled. In addition, a separate control valve (not illustrated) may be mounted on the water supply line 265 to actively control injection of water.

Further, a heater 260 (FIG. 2) may be applied to the mixture pipe 280 of the ejector 100 or the fuel recirculation line, and as a result, low-temperature operation efficiency may be improved by managing increasing the temperature of the water an internal circulation line.

Figure 5:
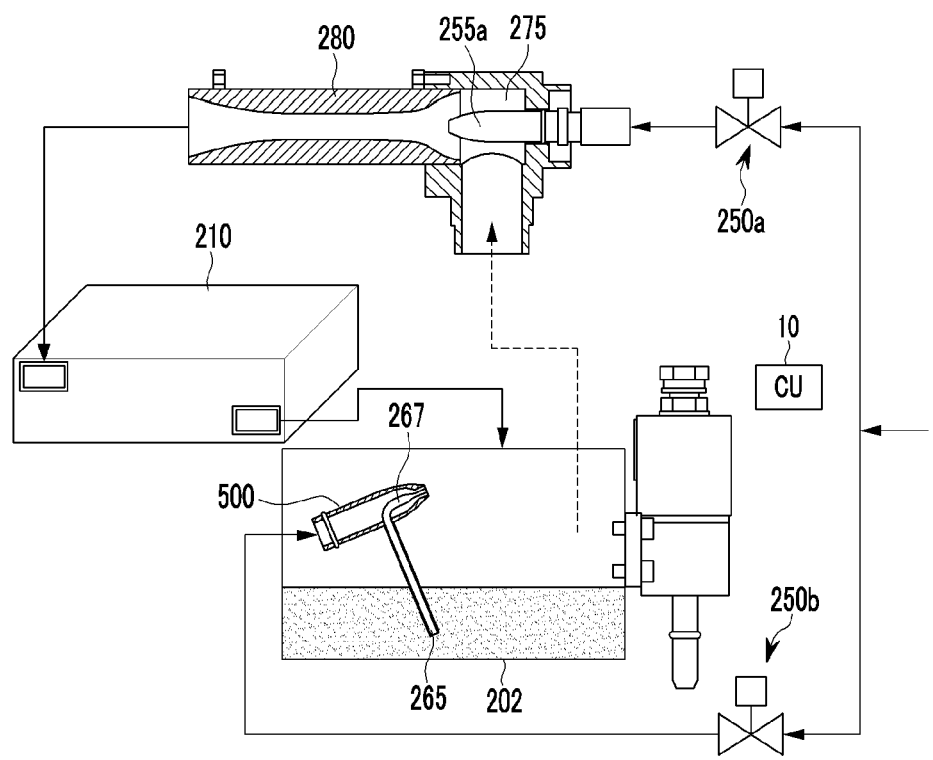
FIG. 5 is a schematic configuration diagram of a fuel cell system having an ejector according to a third exemplary embodiment of the present invention.

FIG. 5 is a schematic configuration diagram of a fuel cell system having an ejector according to a third exemplary embodiment of the present invention. A description of similar parts will be skipped in FIG. 5 as compared with FIGS. 1 to 4 and only a distinct difference will be described.

Referring to FIG. 5, the fuel cell system includes the stack 210, the condensed water reservoir 202, the ejector 100, the mixture pipe 280, and the control unit 10. A main fuel injection nozzle 255a is disposed at the center of the intake chamber 275 formed in the ejector 100, and the control unit 10 controls a main hydrogen control valve 250a to control the amount of hydrogen injected from the main fuel injection nozzle 255a.

A fuel injection nozzle 255b may be disposed in the condensed water reservoir 202 and a water injection nozzle 267 may be disposed inside the fuel injection nozzle 255b. The water supply line 265 may extend to supply water contained in the condensed water reservoir 202 to the water injection nozzle 267.

Moreover, the control unit 10 may be configured to control a hydrogen control valve 250b that regulates the amount of hydrogen supplied to the fuel injection nozzle 255b. In addition, the amount of the water injected from the water injection nozzle 267 may also controlled according to the amount of hydrogen injected from the fuel injection nozzle 255b.

Additionally, the fuel injection nozzle 255b may be inclined to easily supply the fuel and the moisture to the ejector 100 from the condensed water reservoir 202.

Figure 6:
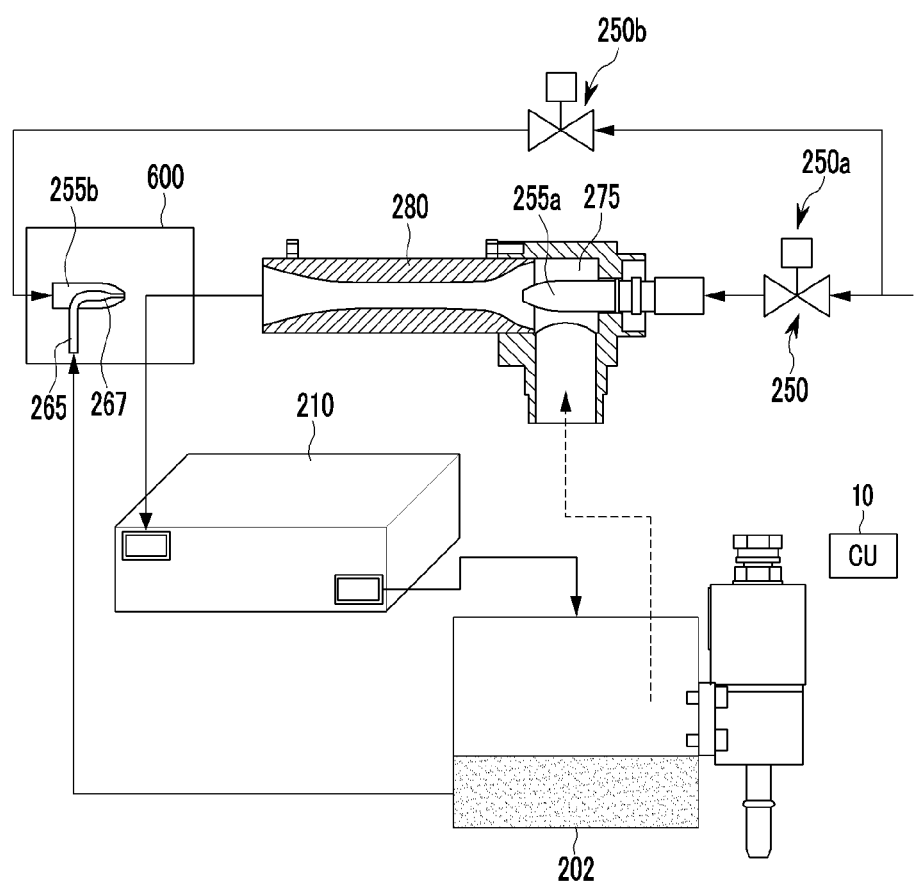
FIG. 6 is a schematic configuration diagram of a fuel cell system having an ejector according to a fourth exemplary embodiment of the present invention.

FIG. 6 is a schematic configuration diagram of a fuel cell system having an ejector according to a fourth exemplary embodiment of the present invention. A description of similar parts will be skipped in FIG. 6 as compared with FIGS. 1 to 5 and only a distinct difference will be described.

Referring to FIG. 6, the main fuel injection nozzle 255a is disposed at a center of the intake chamber 275 formed in the ejector 100, and the control unit 10 may be configured to control the main hydrogen control valve 250a to regulate the amount of hydrogen injected from the main fuel injection nozzle 255a. In addition, a manifold 600 may be formed adjacent to the stack 210 and the hydrogen which is the fuel may be supplied to the stack 210 through the manifold 600.

The fuel injection nozzle 255b may be disposed in the manifold 600 and the water injection nozzle 267 may be disposed inside the fuel injection nozzle 255b. The water supply line 265 may extend into the condensed water reservoir 202 to supply the water contained in the condensed water reservoir 202 to the water injection nozzle 267.

Moreover, the control unit 10 may be configured to control the hydrogen control valve 250b to regulate the amount of hydrogen supplied to the fuel injection nozzle 255b. In addition, the amount of water injected from the water injection nozzle 267 may also be controlled according to the amount of hydrogen injected from the fuel injection nozzle 255b.

Figure 7:
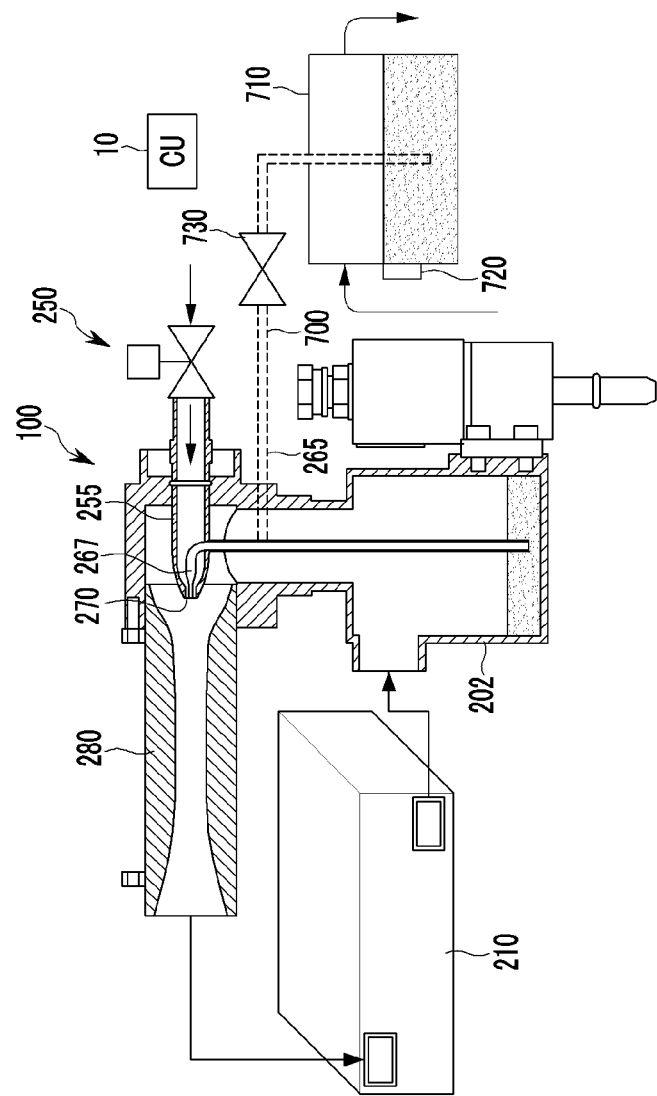
FIG. 7 is a schematic configuration diagram of a fuel cell system having an ejector according to a fifth exemplary embodiment of the present invention.

FIG. 7 is a schematic configuration diagram of a fuel cell system having an ejector according to a fifth exemplary embodiment of the present invention. FIG. 7 is to compared with FIG. 2 and a distinct difference will be described and a description of similar parts will be skipped.

Referring to FIG. 7, the fuel cell system may include an air condensed water reservoir 710, a level sensor 720, and a water supply control valve 730. The air condensed water reservoir 710 may be a space that is disposed on an air circulation line that is circulated in the air electrode to condense and collect moisture included in air. The water supply line 265 may supply water gathered in a lower portion of the condensed water reservoir 202 and water gathered in a lower portion of the air condensed water reservoir 710 to the water injection nozzle 267. In addition, the water supply control valve 730 may regulate the supply of the water contained in the air condensed water reservoir 710.

A level sensor 720 that senses stored water may be disposed in the air condensed water reservoir 710, and the control unit 10 may be configured to determine a level of water through the level sensor 720 and control the water supply control valve 730 according to sensed level.

That is, when it is determined that the level of the water contained in the air condensed water reservoir 710 is below a given value, the control unit 10 may close the water supply control valve 730 and when it is determined that the level of the water is equal to or higher than a set value, the control unit 10 may open the water supply control valve 730. Accordingly, air may be prevented from flowing into a line where the fuel of the fuel cell is circulated.

Figure 8A:
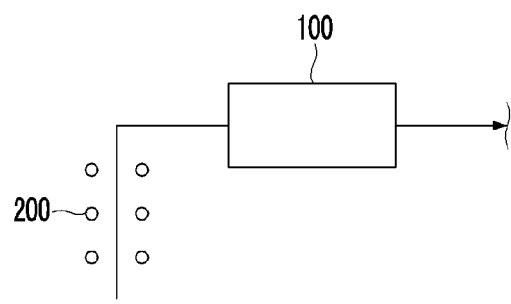
FIGS. 8A, 8B, and 8C are schematic configuration diagrams illustrating a method for heating hydrogen in the fuel cell system having an ejector according to the exemplary embodiment of the present invention.
Figure 8B:
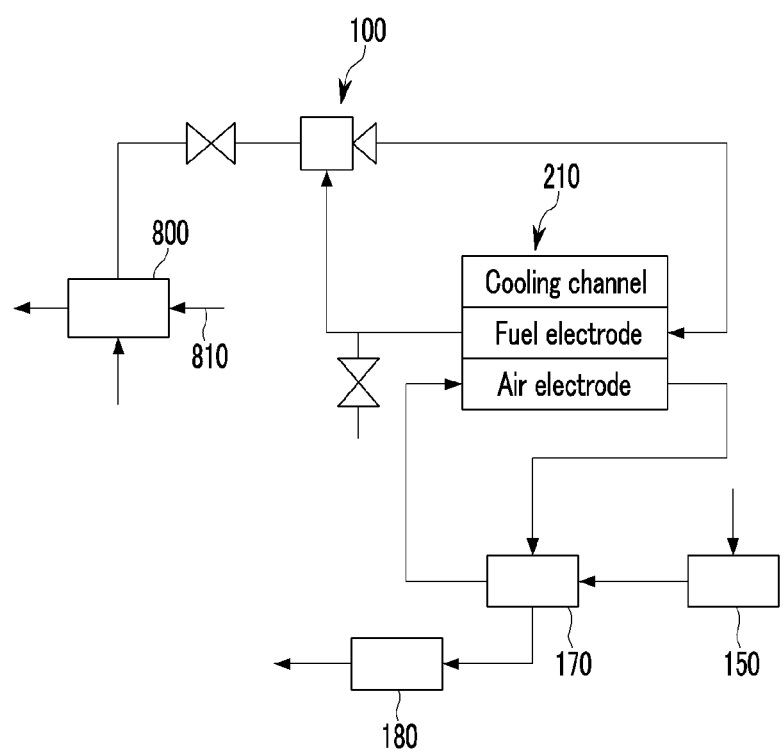
Figure 8C:
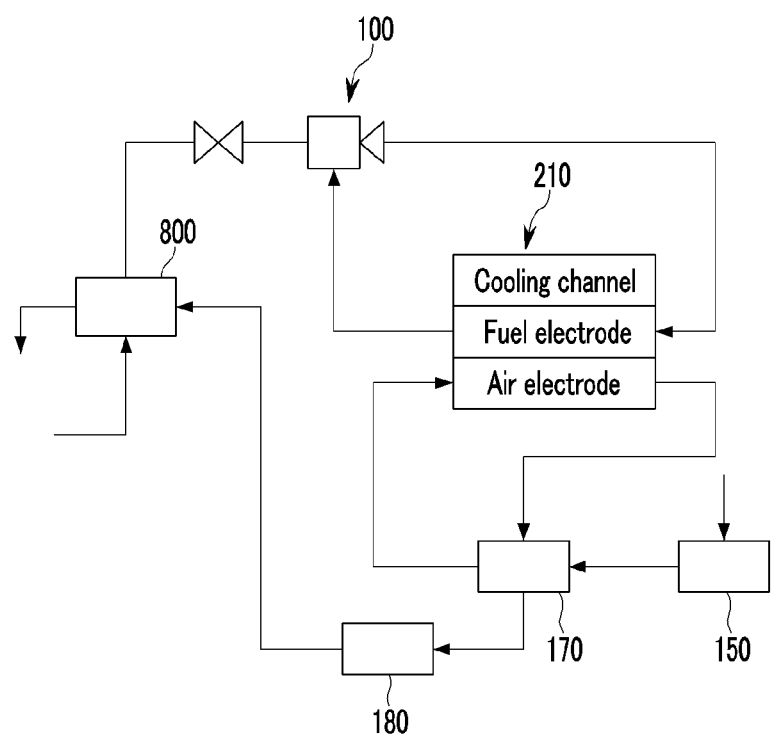

FIGS. 8A, 8B, and 8C are schematic configuration diagrams illustrating a method for heating hydrogen in the fuel cell system having an ejector according to the exemplary embodiment of the present invention.

Referring to FIG. 8A, the heater 260 may be installed within a hydrogen line supplied to the ejector 100 to heat hydrogen.

Referring to FIG. 8B, a heat exchanger may be installed within the hydrogen line supplied to the ejector 100 and coolant and hydrogen pass through the heat exchanger 800 and the hydrogen is heated by the coolant.

Referring to FIG. 8C, a heat exchanger 800 may be disposed within the hydrogen line supplied to the ejector 100, condensed water may be discharged from the humidifier 170 through the discharge valve 180 and the discharged condensed water may pass through the heat exchanger 800. The hydrogen may then be heated by the condensed water.

Figure 9:
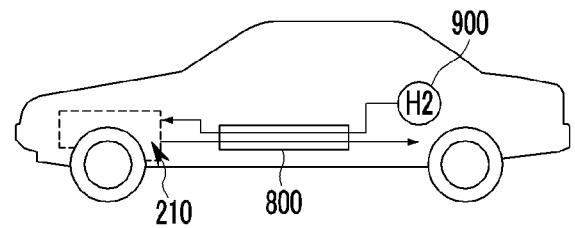
FIG. 9 is a schematic configuration diagram illustrating a position of a heat exchanger that heats hydrogen in the fuel cell system having an ejector according to the exemplary embodiment of the present invention.

FIG. 9 is a schematic configuration diagram illustrating a position of a heat exchanger that heats hydrogen in the fuel cell system having an ejector according to the exemplary embodiment of the present invention. Referring to FIG. 9, the stack 210 is installed at a front-wheel side of a vehicle and a hydrogen tank 900 is installed at a rear-wheel side. Hydrogen is supplied from the hydrogen tank 900 to the stack 210 and the heat exchanger 800 is installed within a supply line. Air discharged from the stack 210 to the outside may pass through the heat exchanger 800 and the discharged air heats the hydrogen. Further, the discharged air can pass through the ejector housing 290 to heat the hydrogen passing the ejector housing 290.

Figure 10A:
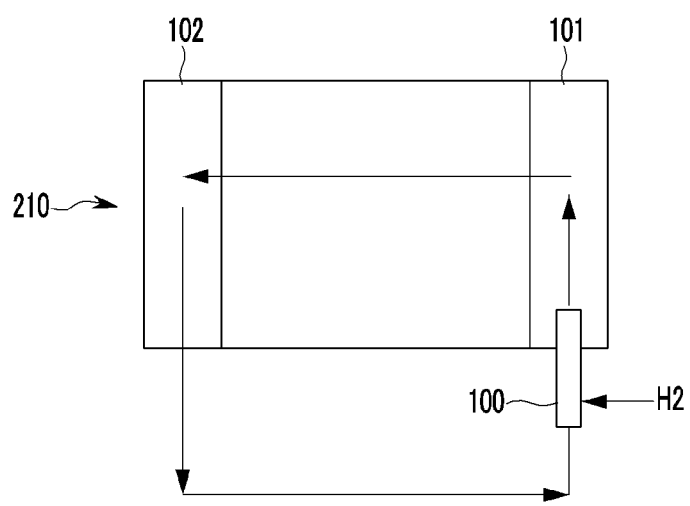
FIGS. 10A and 10B are a plan view and a side view illustrating a method for installing the ejector in the fuel cell system having an ejector according to the exemplary embodiment of the present invention.
Figure 10B:
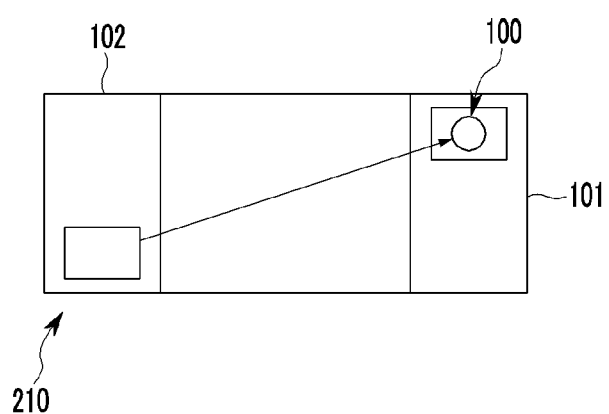

FIGS. 10A and 10B are a plan view and a side view illustrating a method for installing the ejector in the fuel cell system having an ejector according to the exemplary embodiment of the present invention.

Referring to FIGS. 10A and 10B, the ejector 100 may be installed at an inlet side of a fuel supply manifold 101, hydrogen may be injected from the ejector 100 and a to direction in which the hydrogen is injected and a longitudinal direction of the fuel supply manifold 101 may coincide with each other. Moreover, recirculated combustion gas discharged from a fuel discharge manifold 102 may be supplied to the ejector 100 and new hydrogen gas may also be supplied to the ejector 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: Control unit
100: Ejector
210: Stack
255: Fuel injection nozzle
265: Water supply line
267: Water injection nozzle
280: Mixture pipe

What is claimed is:

1. A fuel cell system with an ejector, comprising:
a stack configured to produce electricity via an electrochemical reaction between fuel and air;
a fuel injection nozzle disposed to inject fuel into the stack; and
a water injection nozzle disposed to inject water inside the fuel injection nozzle,
wherein water is supplied from the water injection nozzle into the fuel injection nozzle due to a vacuum within the fuel injection nozzle.

2. The system of claim 1, wherein:
a fuel injection aperture that injects the fuel into the stack is formed in the fuel injection nozzle and a water injection aperture of the water injection nozzle is disposed at a center of the fuel injection aperture.

3. The system of claim 1, wherein:
a water supply line is connected with the water injection nozzle to supply water contained in a lower portion of a condensed water reservoir to the water injection nozzle.

4. The system of claim 1, wherein:
the fuel injection nozzle is disposed in an intake chamber of the ejector where gas circulated in the stack and the fuel are mixed together.

5. The system of claim 1, wherein:
a notch is formed in the fuel injection aperture of the fuel injection nozzle.

6. The system of claim 1, wherein:
the fuel injection nozzle is disposed in a condensed water reservoir in which condensed water is contained, and
a main fuel injection nozzle that injects fuel separately from the fuel injection nozzle is disposed in the intake chamber of the ejector.

7. The system of claim 1, wherein:
the fuel injection nozzle is disposed in a manifold adjacent of the stack, and
a main fuel injection nozzle that injects fuel separately from the fuel injection nozzle is disposed in the intake chamber of the ejector.

8. The system of claim 1, further comprising:
a water supply line which is connected with the water injection nozzle to supply water to the water injection nozzle,
wherein the water supply line is connected with each of a first condensed water reservoir which gathers moisture from the fuel circulated in the stack and a second condensed water reservoir which gathers moisture included in air circulated in the stack.

9. The system of claim 8, further comprising:
a level sensor configured to sense a level of the water contained in the second condensed water reservoir is disposed in the system and a water supply control valve is disposed on a water supply line that connects the second reservoir and the water injection nozzle, and
a control unit is configured to open the water supply control valve when the control unit determines that the level of the water contained in the second reservoir is equal to or higher than a set value.

10. The system of claim 6, further comprising:
a fuel control valve which regulates the fuel supplied to the fuel injection nozzle; and
a main fuel control valve which regulates the fuel supplied to the main fuel injection nozzle.

11. The system of claim 1, further comprising:
a hydrogen line that supplies hydrogen to the fuel injection nozzle; and
a heater that heats the hydrogen line.

12. The system of claim 1, further comprising:
a hydrogen line that supplies hydrogen to the fuel injection nozzle; and
a heat exchanger that is installed on the hydrogen line.

13. The system of claim 12, wherein:
coolant that cools the stack heats hydrogen that passes through the hydrogen line and an ejector housing while passing through the heat exchanger.

14. The system of claim 12, wherein:
condensed water discharged from circulated air circulated in an air electrode of the stack heats the hydrogen that passes through the hydrogen line while passing through the heat exchanger.

15. The system of claim 12, wherein:
the heat exchanger is disposed between the stack and a hydrogen tank that stores hydrogen.

16. The system of claim 1, wherein:
the fuel injection nozzle is installed at an inlet side of the fuel intake manifold so that injection directions of the fuel injected from the fuel injection nozzle and the water and a longitudinal direction of the fuel intake manifold of the stack coincide with each other.

* * * * *